Figure 1:
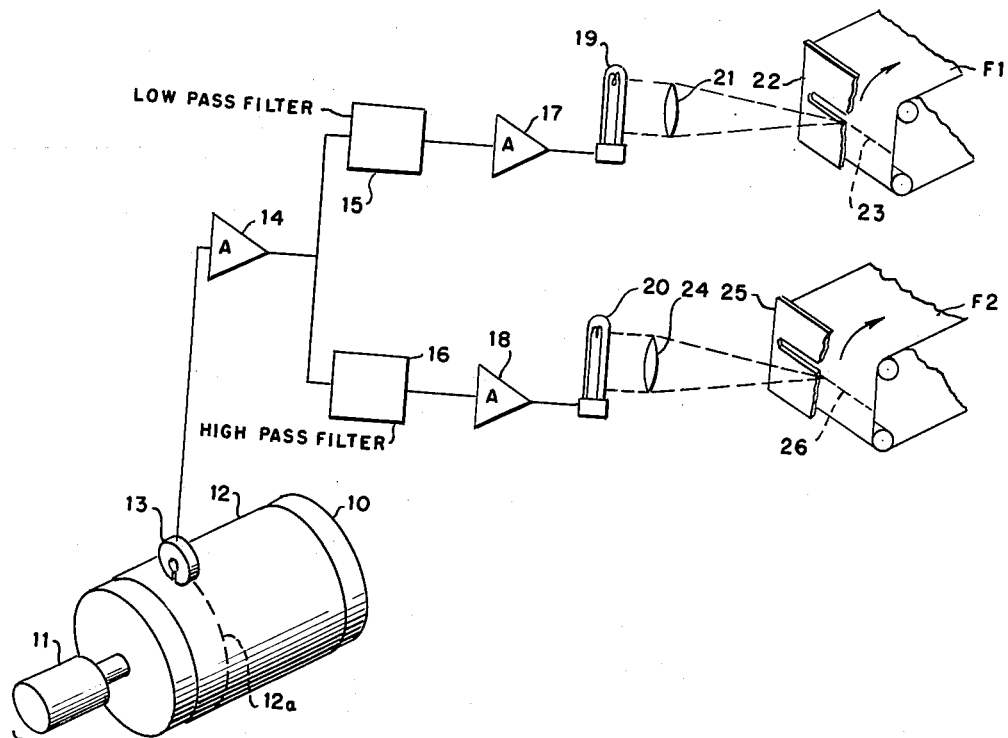

Aug. 21, 1962

E. USDIN

METHOD AND APPARATUS FOR PREPARING DISPLAYS OF SEISMIC INFORMATION 3,050,731

Filed June 26, 1959

INVENTOR.
Eugene Usdin
BY
Adams, Forward and McLean
ATTORNEYS

United States Patent Office 3,050,731
Patented Aug. 21, 1962

3,050,731
METHOD AND APPARATUS FOR PREPARING DISPLAYS OF SEISMIC INFORMATION
Eugene Usdin, Tulsa, Okla., assignor, by mesne assignments, to Sinclair Research, Inc., New York, N.Y., a corporation of Delaware
Filed June 26, 1959, Ser. No. 823,218
2 Claims. (Cl. 346—1)

This invention relates to seismic prospecting and in particular provides a method and apparatus for preparing displays of seismic information by which analysis of such seismic information can be greatly simplified.

As is well-known seismic reflection and refraction data are conventionally recorded as a signal varying transversely in amplitude along a longitudinal base representing time. Many methods for interpreting the significance of the amplitude variations of the signal have been developed. In most instances such methods eventually seek to correlate the amplitude variations with the geologic structure of the earth. It has also been found that in making such correlations the distribution of frequencies in the seismic spectrum of each amplitude variation is at least in part diagnostic of the sub-surface structure which produced such amplitude variation. Attempts to resolve these frequency distributions, however, have not been entirely successful.

It is the particular object of this invention to provide a method and apparatus by which the variations in frequency distribution of the amplitude variations in seismic signals can be displayed visually in a manner clearly distinguishing the frequency content and distribution of the seismic events to which such amplitude variations in the seismic signal correspond.

Thus, in accordance with this invention it is specifically contemplated to prepare a seismogram in which the amplitude variations are converted to color bands marked on the seismogram transversely to the direction of the time base. The resultant seismogram will thus resemble a chromatic spectrogram except the characteristic order of colors found in the latter will not be evident. It is further contemplated that different colors will be employed for each unique frequency distribution of a seismic event. Such a practice, of course, has been conventionally employed by seismologists using, for example, different color pencils to mark the conventional wiggle trace seismogram as an aid in its interpretation. In accordance with this invention, however, a method and apparatus are provided for accomplishing the result optically in a manner by which the choice of color is an inherent result of the frequency content and distribution of a particular seismic event and is not left to the arbitrary determination of the seismologist.

In accordance with this invention, utilization is made of a principle of optics that visual perception of color can be achieved by projecting to a common image two or more photographic transparencies representing black and white reproductions of different frequency content of the same object, if projection lights of different wave lengths are employed. Thus, for example, it is known that if two black and white photographic transparencies are taken of the same object employing, for example, a green filter in one case and a red filter in the other case, the positive black and white transparencies can be projected to form a common image using white and red light, respectively. The resultant image, as it is perceived by the human eye or for that matter by conventional color sensitive photographic media, will contain all of the colors present in the original object. Where color balance is not a criterion, moreover, and where reproduction of all colors is not required, a substantially colored reproduction of the original object can be made using projection light frequencies which can be as closely spaced as two different yellow lights.

In accordance with this invention the preceding optical principle is utilized by photographically reproducing a seismic signal, for example as a black and white transparency in accordance with a method generally designated "variable density recording," in which the amplitude variations of the seismic signal are reproduced as a variation in the density of the transparency. Thus, a variable density recording of a seismic signal is quite similar to a variable density film of a sound signal sometimes employed as a sound track in motion picture photography. In accordance with this invention, however, two such variable density recordings are prepared from the same seismic signal. In each case only a portion of the seismic signal is recorded in the sense that a filter is employed to reject certain of the frequencies present in the original seismic signal, permitting only a limited pass band of frequencies to be recorded. A different pass band of frequencies is selected for each of the two variable density recordings prepared. Thus, for example, while the useful seismic spectrum is generally thought to include from about 10 cycles to about 400 cycles per second, in accordance with the present invention a variable density recording employing a band pass filter which passes only frequencies on the order of 20 cycles is prepared and a second variable density recording employing a band pass filter which passes only frequencies on the order of 60 cycles per second is prepared. The two variable density recordings are then simultaneously projected by optical equipment to form a common image, for example in one case employing white light while in the other employing red light. In this manner, the various seismic events depicted on the resultant seismogram appear in colors of every hue, the particular colors being determined by the balance between low and high frequency components selected through the two band pass filters.

Figure 2:
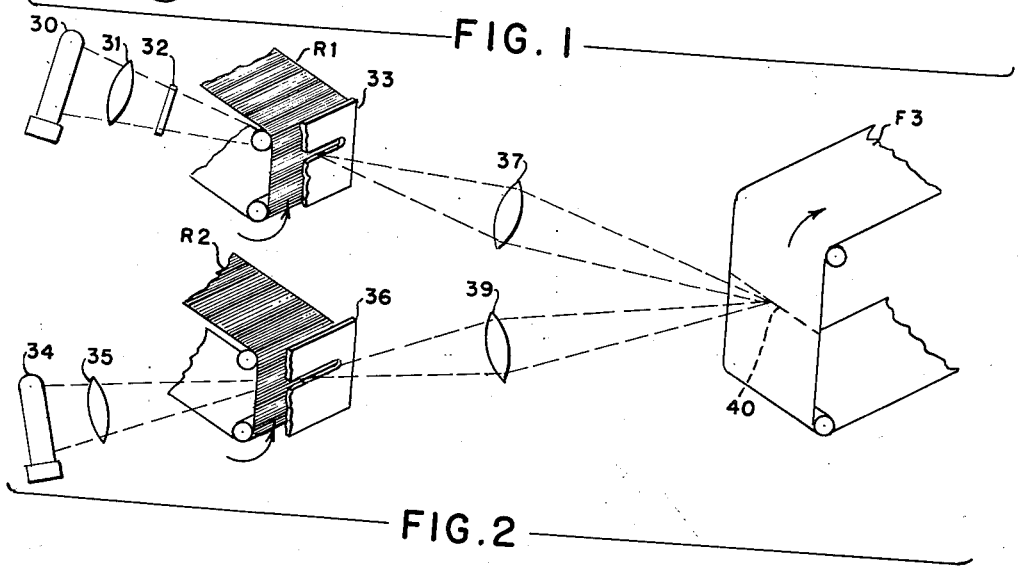

For a more complete understanding of the practical application of this invention, reference is made to the appended drawings in which:

FIGURE 1 diagrammatically represents an arrangement of apparatus suitable for preparing the variable density recordings; and FIGURE 2 diagrammatically represents an arrangement of apparatus for simultaneously projecting such variable density recordings to form a common image.

Referring more particularly to FIGURE 1, the reference numeral 10 designates a magnetic recording tape receiving drum typical of those employed in reproducing magnetic tapes employed for recording seismic signals. Drum 10 is arranged to be rotated by a motor 11. A typical magnetic recording tape 12 is mounted about drum 10 and will contain usually twenty-five signals separately recorded on parallel tracks, i.e. paths 12a along the length of tape 12. When tape 12 is mounted about drum 10 and drum 10 is rotated by motor 11 the path of each record track 12a can be made to pass beneath a magnetic pick-up head 13. Although in the conventional case twenty-five such tracks 12a and pick-up heads 13 are employed, for illustrative purpose a single track 12a and pick-up head 13 are shown. Head 13 is mounted adjacent to the surface of tape 12 to reproduce electrically the signal magnetically recorded on tape 12 along a track 12a.

The electrical output signal of pick-up 13 is connected as an input to an amplifier 14, the output of which is divided and connected as inputs to two filters 15 and 16. The outputs of filters 15 and 16 are respectively connected as inputs to amplifiers 17 and 18. Amplifier 17 is employed to control the energizing current for a first projection lamp 19 while amplifier 18 is employed to control the energizing current for a second projection lamp 20. Lamps 19 and 20 are preferably gas-filled glow lamps commonly known as glow modulators. Thus, the inensity of illumination of lamps 19 and 20 will be determined by the signal recorded on track 12a, modified, however, by the characteristics of filters 15 and 16, respectively.

In the illustrated arrangement, the filter 15 is a low-pass filter, while filter 16 is a high-pass filter. Thus, as motor 11 rotates drum 10 to pass track 12a by pick-up head 13, lamp 19 will have its intensity controlled as a function of the low frequency content of the signal recorded on track 12a, while lamp 20 will have its intensity controlled as a function of the high frequency content of such signal.

The light generated by lamp 19 is collimated by a lens 21 and passed through an elongated slit in a plate 22 to bring such light into focus as a line image 23. The light generated by lamp 20 is similarly collimated by a lens 24 and passed through an elongated slit in a plate 24 to bring such light into focus as a line image 26.

Plate 22 is normally a portion of a camera enclosing a black and white photo-sensitive film F1, which is suitably mounted in the camera to permit it to be drawn through a focal plane including line image 23 such that line image 23 lies transversely across film F1. Provision is made for synchronizing the movement of film F1 and the rotation of drum 10 in a manner such as customarily employed, for example, in a typical siesmic signal display system to synchronize a tape drum and a galvanometer camera.

Plate 25 is similarly a portion of a second camera enclosing a film F2, which like film F1, is arranged in the camera to be drawn through a focal plane including line image 26 such that line image 26 lies transversely across film F1. The mechanism by which film F2 is drawn is also synchronized with the rotation of drum 10, and its speed of movement is made identical to the speed of movement at which film F1 is drawn.

Thus, in utilizing the apparatus of FIGURE 1, films F1 and F2, which typically are 8 mm. panchromatic film, are positioned in their respective cameras ready to be exposed. Shutters are provided which remain closed to prevent exposure, however. Motor 11 is then started to carry track 12a cyclically past pick-up 13. The resultant low frequency output of amplifier 17 and high frequency output of amplifier 18 are first visually displayed in a conventional manner as separate signals on a cathode ray tube oscilloscope in which the horizontal sweep rate is synchronized with the rotation of drum 10 to cause the two signals to be displayed in their entire extent vertically displaced parallel to each other. By this means, the pass bands of filters 15 and 16 can be adjusted as may be thought desirable.

It should be noted that in a conventional laboratory set-up, many filters are available for selection and it is common practice to take a seismic signal, while viewing it on the oscilloscope screen, and select pass bands which show desired characteristics prior to recording such signals as wiggle traces by means of mirror galvanometer equipped cameras. In accordance with this invention, however, when the desired characteristics of the two signals are achieved the outputs of amplifiers 17 and 18 are then employed to control the intensity of illumination of lamps 19 and 20. A record is then made on both films F1 and F2 by opening the shutters of their respective cameras and initiating movement of films F1 and F2 in synchronism at the same rates of speed commencing a few milliseconds before the initial time break of the record on track 12a. The recording step is stopped on completion of one cycle of rotation of track 12a on drum 10 from the time break such that films F1 and F2 will be exposed throughout the useful length of the seismic signal. As the recording step is completed, of course, the shutters of the respective cameras enclosing films F1 and F2 are simultaneously closed.

Films F1 and F2 are then developed with the result that the exposure made by moving the films through the positions of line images 23 and 26 results in a pair of film records R1 and R2 having transversely marked dark and light bands shading from one into the other which are known in the art as "variable density recordings."

Records R1 and R2 then can be used to obtain positive records or can be used directly in the optical apparatus illustrated diagrammatically in FIGURE 2, record R1 being mounted in a projector including a constant intensity projection lamp 30, a lens 31 positioned to direct the light from lamp 30 through a red glass filter 32 and then through an elongated slit in a plate 33. Record R1 is mounted in the projector to be drawn past the slit in plate 33 such that the slit aligns transversely across record R1. Record R2 is similarly mounted in a second projector including a constant intensity projection lamp 34 and a lens 35 which is positioned to direct the light from lamp 34 through the elongated slit in a plate 36. Record R2 is positioned in its projector such that it can be drawn past the slit in plate 36 with the slit aligned transversely across record R2.

The red filtered light emerging through the slit in plate 33 thus has its intensity controlled by the density of record R1 and similarly, the white light output passing through the slit in plate 36 has its intensity controlled by the density of record R2. The red light output from the slit in plate 33 is collimated by a lens 37, and the white light output emerging from the slit in plate 36 is collimated by a lens 39. Lenses 37 and 39 are disposed such that the two beams of light are brought to a common focus as a line image 40.

A camera is provided for exposing a film F3 having a color-sensitive emulsion. The camera containing film F3 is provided with the usual mechanism for drawing film F3 past a shutter and is mounted to admit the light from lenses 37 and 39 through the shutter such that line image 40 falls on film F3 transversely to the direction of its movement past the camera shutter.

The apparatus shown in FIGURE 2 is further provided with a mechanism for simultaneously opening the shutter of the camera including film F3 and initiating movement of records R1 and R2 in their respective projectors at identical rates of speed and for simultaneously causing film F3 to be drawn past the open shutter in its camera. Thus in operation the variable density records R1 and R2 are mounted in their respective projectors and are positioned to initiate operation with their portions representing the time break of the original seismic signal aligned with the slits in plates 33 and 36, respectively. Lamps 30 and 34 are, of course, energized.

The shutter in the camera enclosing film F3 is then opened and records R1 and R2 and film F3 are simultaneously moved past the associated slits in plates 33 and 36 and the shutter in the camera enclosing film F3, respectively. Since records R1 and R2 are drawn at identical rates of speed and were prepared at identical rates of speed, the line image 40 falling on film F3 at any instant represents a common seismic event.

By reason of the optical principle adverted to above, line image 40 will appear to film F3 to assume a color varying from red to violet depending upon the balance of densities on records R1 and R2 corresponding to the original seismic events. Since the red light is employed to expose the low pass record R1 and a white light is employed to project the high pass record R2, the color spectrum obtained will vary toward red when the original seismic signal predominated in low frequency components and will vary toward violet when the original seismic signal contained more high frequency components.

The exposed color film F3 is then developed and can be employed, if prepared as a color transparency for, projection purposes or can be directly viewed, where a print is directly made. Since the color appears as bands marked transversely on the exposed and developed film F3 and each color band will uniquely represent the balance of high and low frequency components, it will be apparent that the color bands are diagnositc of the subsurface structure producing the seismic events the color bands represent. Thus, it is contemplated that seismic cross-sections can be prepared by similarly reproducing many seismic signals along a profile employing the same filter combinations to produce a color cross-section in which the color lines formed by connecting color bands on adjacent records will depict the subsurface structure in a unique and distinctive manner, greatly simplifying the analysis of the original seismic records.

While many variations in selection of seismic filters can be employed, it is preferred to employ conventional band pass filters, one passing a band centered at 20 cycles and 12 decibels down per octave and the other passing a band centered at 60 cycles and 12 decibels down per octave, as low pass filter 15 and high pass filter 17, respectively. It will be apparent, however, in some situations a study may be desired concentrated in the high frequency end of the spectrum for which purpose filters 15 and 17 can be extremely sharp m-derived band pass filters centered, for example, at 60 and 80 cycles per second. Alternatively, filters 15 and 17 can be high cut-off and low cut-off filters, respectively, employing a common cut-off frequency such as 50 cycles per second rather than being band pass filters.

While the employment of the invention has been described solely with reference to variable density recordings of conventional nature, any recording which will simulate a varying density can be suitably employed where the varying density is continuous as in the illustrated case, or where it is shaded, dotted or the like. Variable area records can alternatively be employed if not located at a focal point in projection.

Similarly, while the invention has been described employing only white and red projection light, color variations can be employed using two sources of monochromatic light which differ in wave length as widely as red and violet or as closely as two mono-chromatic sources separated in wave length by as few as 10 millimicrons. Generally a wave length differential of 50 millimicrons or greater is desired in order to provide a broader range of color. Less than 10 millimicrons separation generally is incapable of producing color.

It will also be apparent that when projecting records R1 and R2 on film F3 the entire records can be projected simultaneously, if their size permits, to form a single image on a stationary film F3.

While the employment of this invention has been described above with separate preparation of variable density recordings and the subsequent projection of such recordings to prepare a common image in color, it will also be apparent the apparatus of FIGURE 2 excluding lamps 30 and 34 can be substituted for that portion of the apparatus in FIGURE 1 following lamps 19 and 20. Thus the final recording on film F3 can be directly prepared thereby eliminating the preparation and employment of the variable density recordings. The illustrated method and apparatus, however, are preferred since they are more amenable to projection methods of display where a screen is substituted for recording film F3 in which event, the projectors are equipped for manual record movement both forward and reverse to permit study of specific portions of the seismogram.

I claim:
1. A method for preparing visual displays of seismic signals which includes reproducing a first selected frequency spectrum of a seismic signal as a first variable density recording along the length of a first photographic medium moved continuously as a function of time, reproducing a second selected frequency spectrum of said seismic signal as a second variable density recording along the length of a second photographic medium moved continuously as a function of time, in which said first variable density recording is thereafter projected with a first light of a first predetermined light frequency content, and said second variable density recording is simultaneously projected with a second light of a second predetermined light frequency content, said first and second variable density recordings being moved uniformly in synchronism past said first light and said second light respectively, and directing said projected light of said first predetermined light frequency content and said projected light of said second predetermined light frequency content to produce a common visual image varying in light content as a function of time.

2. The method according to claim 5 in which said common visual image is recorded along the length of a color sensitive photographic medium moved continuously as a function of time.

References Cited in the file of this patent
UNITED STATES PATENTS

| | | |
|---|---|---|
| 2,578,133 | Hawkins | Dec. 11, 1951 |
| 2,791,288 | Meier | May 7, 1957 |
| 2,944,620 | Van Dijck | July 12, 1960 |

FOREIGN PATENTS

| | | |
|---|---|---|
| 329,438 | Great Britain | May 22, 1930 |

OTHER REFERENCES
"Scientific American," May 1959.

UNITED STATES PATENT OFFICE
CERTIFICATE OF CORRECTION

Patent No. 3,050,731                                        August 21, 1962

Eugene Usdin

It is hereby certified that error appears in the above numbered patent requiring correction and that the said Letters Patent should read as corrected below.

Column 6, line 36, for the claim reference numeral "5" read -- 1 --.

Signed and sealed this 18th day of December 1962.

SEAL)
Attest:

ERNEST W. SWIDER                                    DAVID L. LADD
Attesting Officer                                         Commissioner of Patents